E. V. HARTFORD.
SPRING CONTROLLER FOR VEHICLES.
APPLICATION FILED DEC. 22, 1909.
1,121,012.
Patented Dec. 15, 1914.
4 SHEETS—SHEET 1.
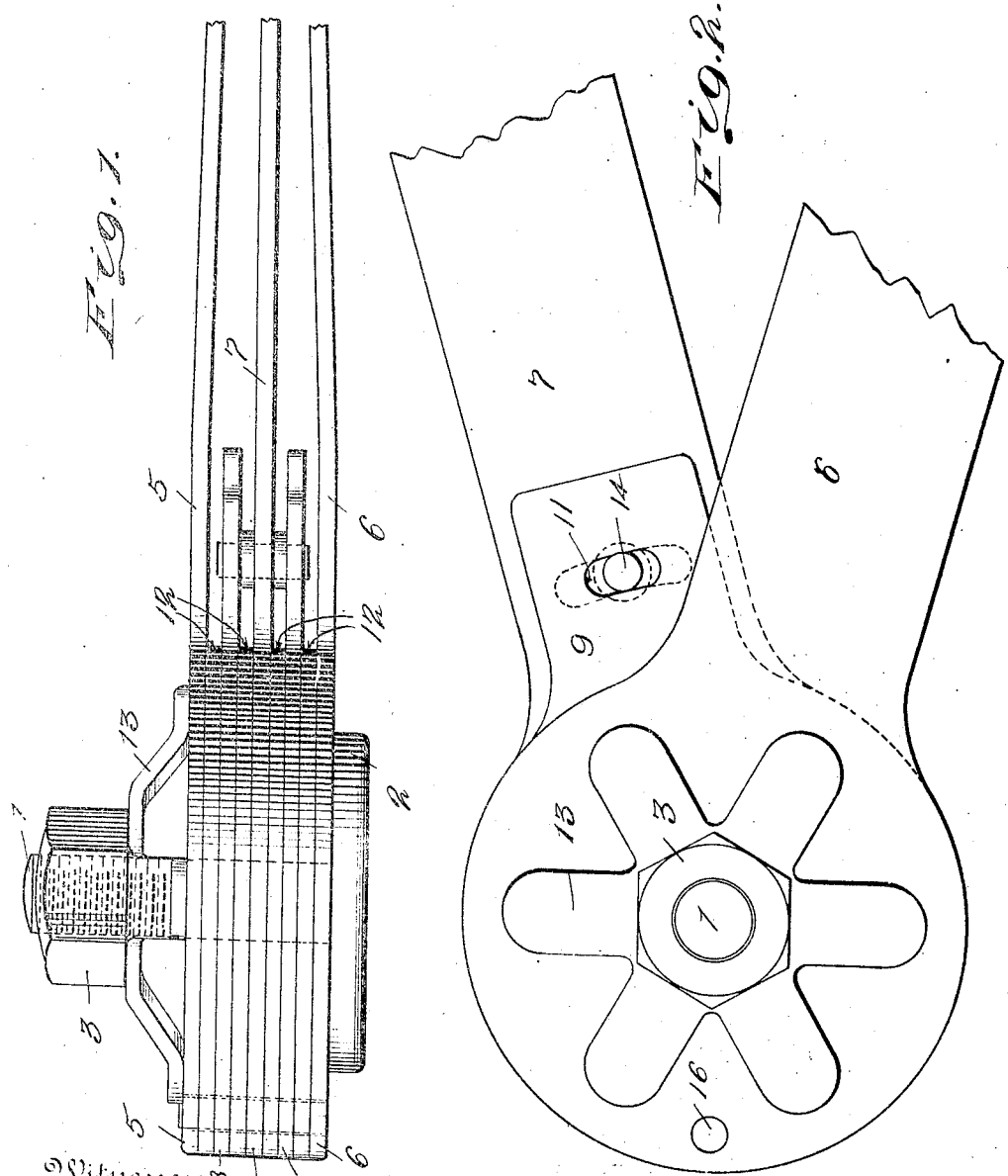

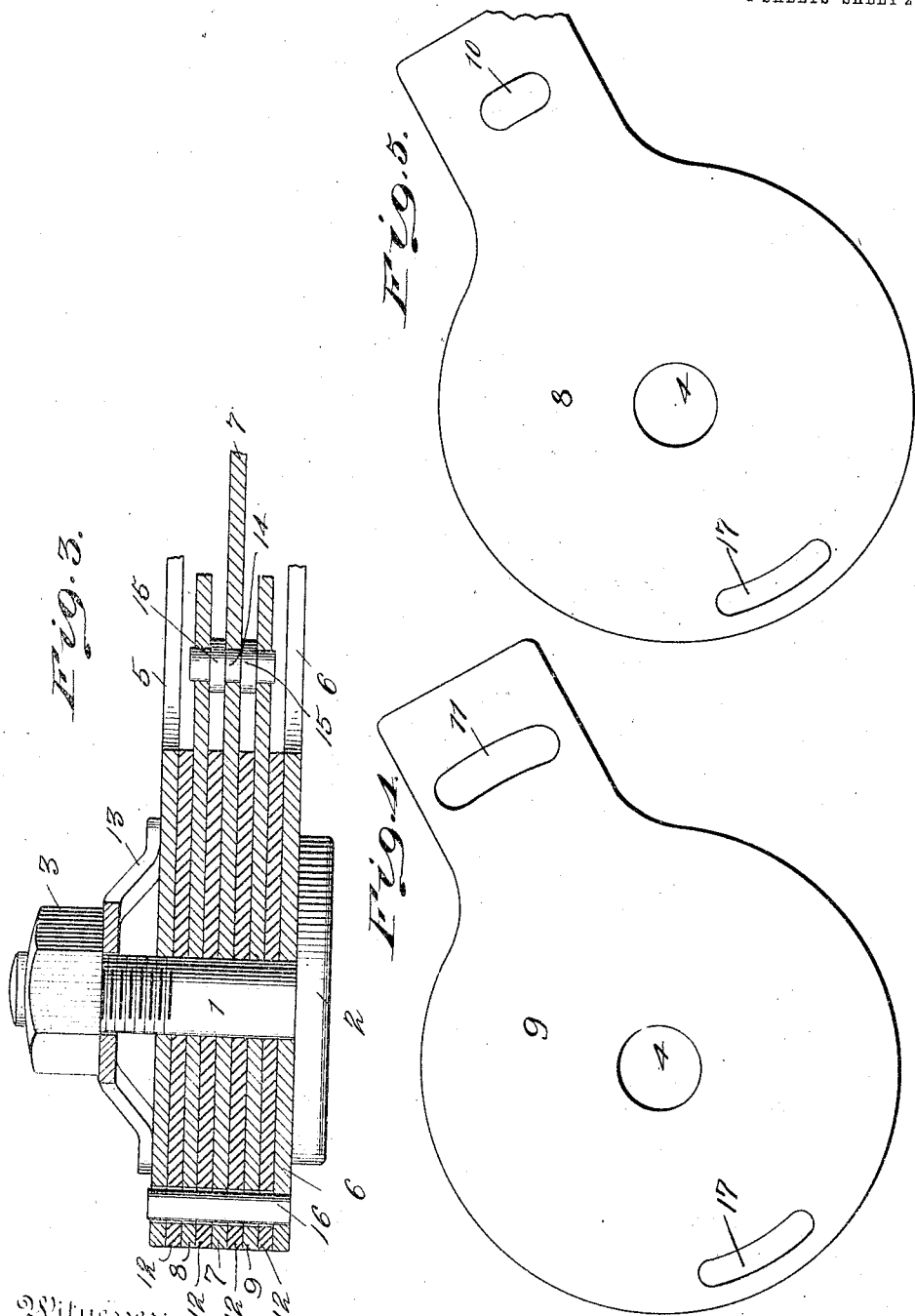

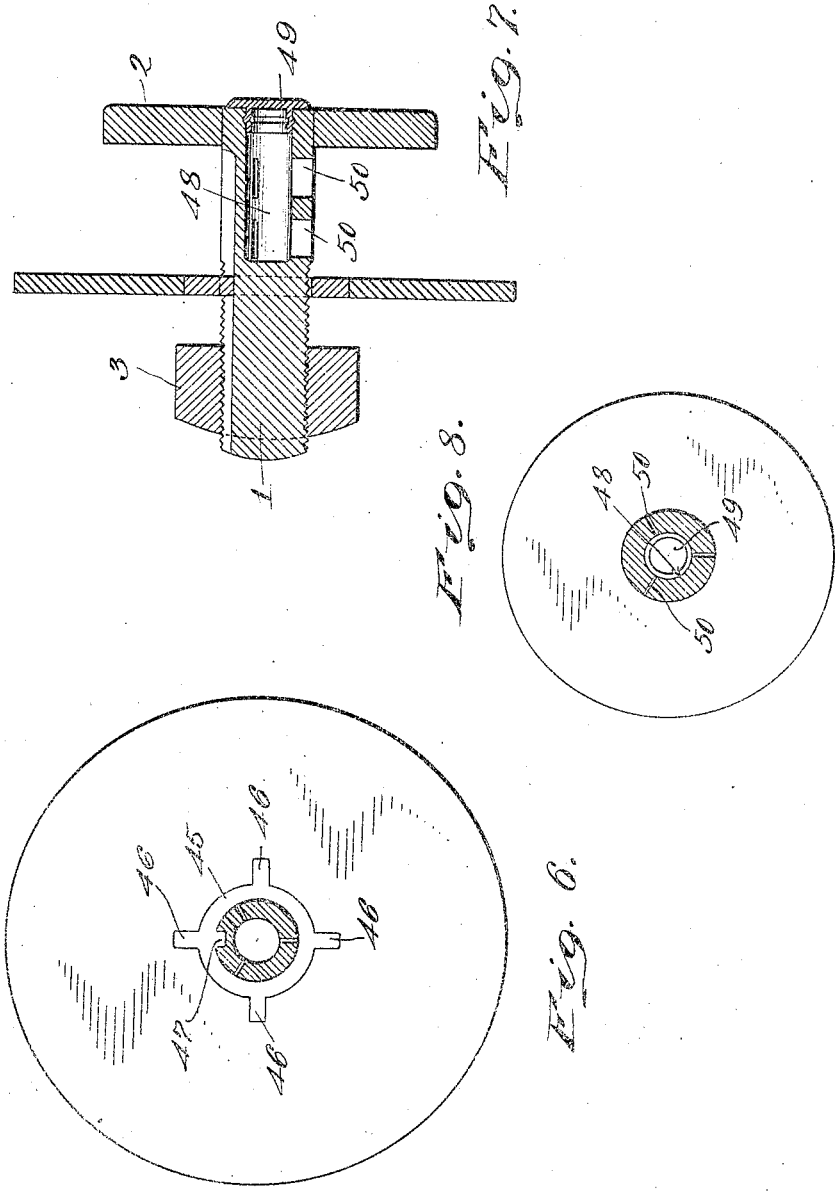

E. V. HARTFORD.
SPRING CONTROLLER FOR VEHICLES.
APPLICATION FILED DEC. 22, 1909.
1,121,012.
Patented Dec. 15, 1914.
4 SHEETS—SHEET 4.
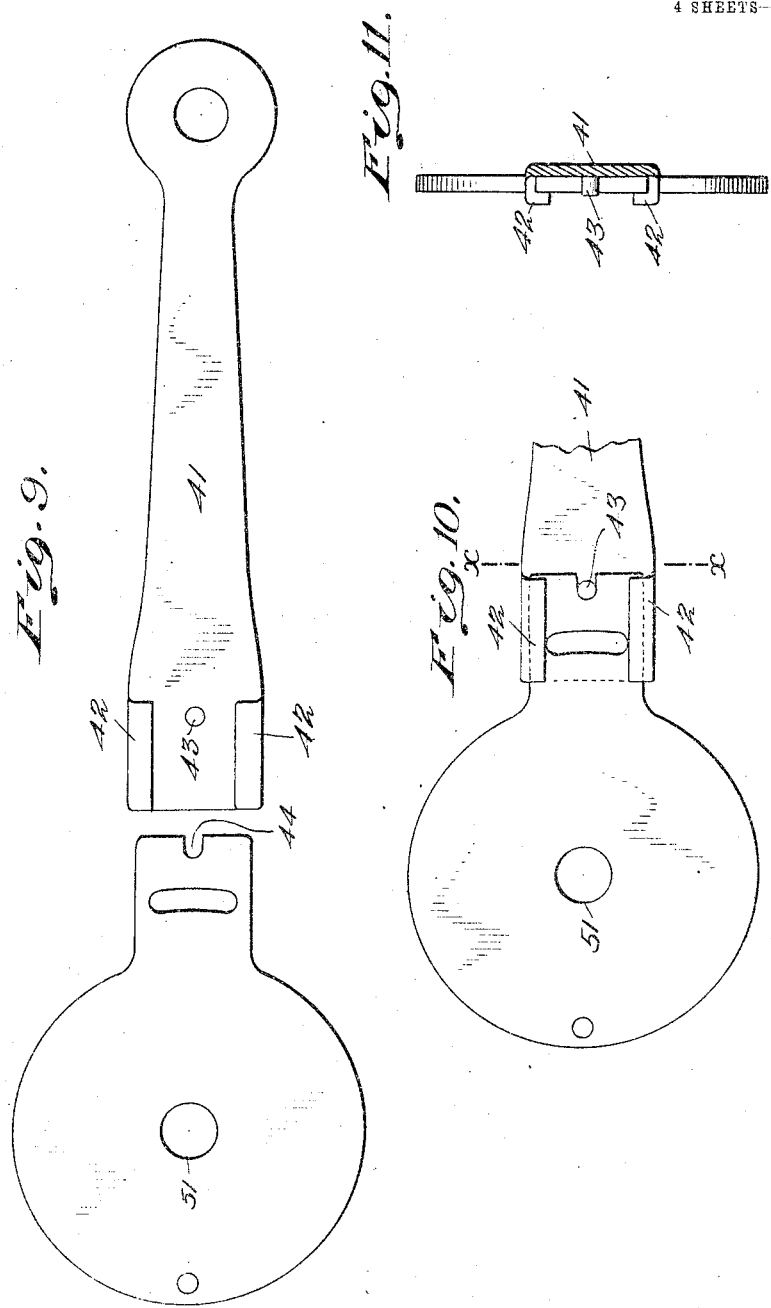

UNITED STATES PATENT OFFICE.

EDWARD V. HARTFORD, OF DEAL, NEW JERSEY.

SPRING-CONTROLLER FOR VEHICLES.

1,121,012.

Specification of Letters Patent.

Patented Dec. 15, 1914.

Application filed December 22, 1909. Serial No. 534,413.

*To all whom it may concern:*

Be it known that I, EDWARD V. HARTFORD, a citizen of the United States, residing at Deal, in the county of Monmouth and State of New Jersey, have invented certain new and useful Improvements in Spring-Controllers for Vehicles, of which the following is a full, clear, and exact specification.

My invention relates to certain new and useful improvements in devices for retarding or controlling the action of vehicle springs, and it has for its object the production of a more perfectly-operating and satisfactory apparatus than any heretofore used. In its broader aspects its construction is such as to produce a progressively-increasing frictional resistance to the action of the vehicle spring in proportion to the movement thereof, such increase, however, being of a step-by-step character, as distinguished from the gradual or sliding scale.

The purpose has been to provide a structure wherein a reasonable amount of friction is employed to control the smaller and more ordinary vibrations, while different and greater degrees of friction are brought into operation to control the greater or unusual vibrations, the amount of friction in each case being predetermined.

Other novel features of my invention consist in means for permitting of a determination of the amount of friction produced by each of the several members without dismounting the apparatus from the vehicle, and likewise novel lubricating means and novel and useful details of construction which will be hereinafter more particularly described.

It will be understood that my invention is capable of embodiment in various ways and in many different forms of apparatus and I do not intend to confine myself to any particular form or forms thereof. In the drawings accompanying this application, however, I have illustrated two typical forms thereof, and in these drawings Figure 1 is a top plan view of a practicable embodiment of a form of my invention. Fig. 2 is a side elevation thereof. Fig. 3 is a longitudinal sectional view thereof. Fig. 4 is a plan view of one of the internal members thereof. Fig. 5 a plan view of another internal member. Fig. 6 is a plan view of a form of friction washer, showing means for preventing its rotation. Fig. 7 is a sectional view of the central-holding bolt and nut, showing the lubricant receptacle; and Fig. 8 is a plan of another form of washer in position on the bolt. Fig. 9 is a plan view of one of the internal friction members with a testing handle. Fig. 10 a similar view with the handle shown seated; and Fig. 11 is a section taken on lines $x$—$x$ of Fig. 10.

In the apparatus illustrated the main bolt or stud on which the various members are mounted is indicated by the reference character 1, said stud being shown provided with an enlarged head 2, and having its end screw-threaded and engaged by the nut 3. Upon this stud are mounted the friction members, which are preferably circular and have a central aperture 4, in which the bolt or stud is seated. The friction members, in the form shown, consists of two outer members 5 and 6, having operating arms formed integral therewith, and the ends of said arms are constructed for connection to one of the parts of the vehicle between which the spring is interposed. This construction is not herein specifically described or illustrated, as it has been previously explained by me in earlier applications and is well known and understood in the art. Intermediate said outer friction members 5 and 6, are shown located interior friction members 7, 8, and 9, the central member 7 having an operating arm preferably formed integral therewith and adapted for connection at its outer end with the other of the parts of the vehicle between which the spring is shown interposed. The friction member 8 is provided with a shorter integral operating arm, in which latter is located a slot 10. Friction member 9 has a similar arm provided with a somewhat longer slot 11. When in operative position, the various friction members are separated or spaced by means of friction washers 12. These washers are preferably similar in size and shape to the friction portion of the friction members, and are shown provided with circular, central apertures for the bolt 1.

To provide for satisfactory and compensating pressure-regulating means for the friction members and interposed washers, I prefer to employ a spider-shaped spring 13, having a central aperture for the bolt 1. In Figs. 1 and 2, the fingers of said spring are shown bearing upon the outer surface of the outer friction member 5 near its periphery, the central portion being in contact with the nut 3. By tightening up this nut, the desirable degree of pressure may be obtained between the friction members and their adjacent washers. The spider spring serves to distribute this pressure uniformly throughout the area of the disks. The enlarged head 2, of the bolt 1 sustains and supports the friction member 6 with which it contacts, and thus prevents any possible flexure or distortion of said member.

To the arm of the friction member 7, is shown rigidly secured a pin or stud 14, the stud being secured at its center and having its ends projected into the slots 10 and 11 of friction members 8 and 9. Suitable distance-pieces or spacing-washers 15 are shown on said pin to maintain the arms of members 8 and 9 in alinement with said members. To prevent any rotation of the friction washers 12 with respect to the outer friction members 5 and 6, a pin 16 is provided, one end of which is firmly secured near the periphery of the friction member 6. This pin is seated in suitable circular apertures in said friction washers and also in slots 17 located near the peripheries of friction members 7, 8, and 9. The pin is also seated in an aperture in friction member 5, in which it fits snugly, but not tight enough to prevent the movement of said member 5 in a direction toward or away from the member 6 in adjusting the pressure between the various members.

The operation of the foregoing device will be readily understood. When the parts are assembled and the friction members and washers clamped firmly, movement of the friction members with respect to each other is resisted by the friction between said members and the coöperating faces of the interposed washers. When the outer ends of the arms of members 5 and 6, and the member 7 are connected to the vehicle in the manner heretofore described, any movement of the parts causes a relative movement between the members 5 and 6 and the member 7. This movement is retarded by the friction between the friction member 7 and the coöperating washers, and if the movement be slight and less than the travel of the pin 14 in the slot 10 of member 8, the frictional resistance exercised is that only. If, however, the movement be greater, one end of the pin 14 will contact with one end of the slot 10, and thus the member 8 will be moved, its movement, however, being retarded by the frictional resistance between it and its coöperating friction washer surfaces. The movement thus produced, therefore, is retarded not only by the friction between the member 7 and its contacting washers, but also by the friction between the member 8 and its contacting washers. Should the movement be still greater than as thus described, the other end of the pin 14 will contact with one end of the slot 11 and thus move the member 9, thereby increasing the resistance by the addition of the friction between said member 9 and its coöperating washers. It will thus be seen that in operation, the device, as illustrated and described, contains a plurality of friction members adapted to be successively brought into operation, according to the amount of relative movement between the arms of members 5 and 6 and of member 7, and thus I have provided means for retarding a vehicle spring in proportion, generally, to the amount of movement of said spring.

In some cases it is desirable to determine, during operation and without dismounting the whole apparatus, the exact amount of retarding action being exerted by any one of the friction members, and to this end I have devised an individual operating means, a form of which is shown in Figs. 9, 10, 11. The device consists of an operating arm 41, the end of which is provided with gripping flanges 42, adapted to engage the end of the arms of the disk to be tested, and a pin 43 is provided for engagement with a recess 44, in the end of said arm. By connecting the arm as shown in Fig. 10, the individual member may be operated, or oscillated about their central openings 51, and thus the exact amount of friction which this member is effecting in operation can readily be measured and determined.

As previously stated, it is desirable in some instances to insure the friction washers from rotation, and in Fig. 6 I have shown means for obtaining this result. In this construction the friction washers (which may be of wood, leather, fiber, or other material), are provided with a central section or portion 45, fixed firmly by means of lugs 46, into the body of the washer. This section is provided with a finger or key 47, which key is adapted to slide in a slot cut vertically in the bolt 1, as shown. In order to obtain the best results, it is also desirable that the parts be properly lubricated at all times, as thus undue wear is prevented and the life of the apparatus very greatly prolonged. One novel method of obtaining proper lubrication is illustrated most clearly in Fig. 7 and consists in providing the bolt 1 with a central aperture or chamber 48, adapted to be closed by a spring cap 49. Slots 50 extend from said chamber to the outer edges of the bolt and serve as passageways for egress of the lubricating material, which may be inserted in the chamber 48, and direct it or permit it to flow outward between the friction surfaces to lubricate the same.

While the devices above described provide but three degrees of friction, it is obvious that these are merely illustrative. Additional friction members adapted to be successively brought into operation may be added to any desired extent, and I do not mean to limit myself to the particular number shown and described.

It is obvious that many modifications and changes may be made in my invention without departing from the spirit thereof, and I do not means to limit myself to the exact construction shown and described, but

What I claim and desire to secure by Letters Patent is—

1. A spring controller for vehicles comprising a pair of concurrently movable friction members, having means adapted to be secured to one part of the vehicle, a plurality of friction disks interposed between said friction members, one of said disks being centrally located with relation to the other of said disks and provided with means adapted to be secured to another part of the vehicle, and means carried by said centrally located disk and in engagement with certain other of the remaining disks, whereby a predetermined movement of the centrally located disk will render the said remaining disks operative in sequence.

2. A spring controller for vehicles comprising a pair of concurrently movable friction members, having means adapted to be secured to one part of the vehicle, a plurality of friction disks positioned therebetween, one of said disks being centrally located with relation to the other of said disks, and provided with means adapted to be attached to another part of the vehicle, means in positive engagement with one of said pair of friction members and passing through all of said parts in frictional engagement to maintain the alinement thereof, and means carried by said centrally located disk adapted to engage with certain of the remaining disks to render said disks frictionally operative in sequence.

3. A spring controller for vehicles comprising a pair of concurrently movable friction members having means adapted to be secured to one part of the vehicle, a plurality of friction disks interposed therebetween, one of said disks being centrally located with relation to the other of said disks and provided with means adapted to be secured to another part of the vehicle, means carried by said centrally located disk and arranged to engage with certain other of the remaining disks, whereby a predetermined movement of said centrally located disk will render said remaining disks operative in sequence, and means normally in engagement with one of said movable members at a plurality of points to maintain all of said parts in constant frictional contact.

4. A spring controller for vehicles comprising a pair of concurrently movable friction members, having means adapted to be secured to one part of the vehicle, a plurality of friction disks interposed therebetween, one of said disks being centrally located with relation to the other of said disks and provided with means adapted to be secured to another part of the vehicle, means in positive engagement with one of said pair of movable members and adapted to maintain all of said parts in coöperative relation, means in engagement with the other of said pair of movable members at a plurality of points to maintain all of said parts in constant frictional contact, and means carried by said centrally located disk and in engagement with certain other of the remaining disks whereby a predetermined movement of said centrally located member will render said remaining disks frictionally operative in sequence.

5. A spring controller comprising a series of successively-active friction members and means carried by certain of said members and adapted for testing the frictional resistance thereof.

6. The combination with a series of friction members connected together for movement in unison, of a second series of friction members in frictional engagement with the members of the first series, connecting means for sequentially uniting the members of the second series for causing the same to move in unison relative to the members of the first series, and means carried by certain of said members and adapted for severally testing the frictional resistance of the sequentially-active members.

7. The combination with a series of friction plates mounted for oscillation about a common axis, of means for uniting the members of the series sequentially together for oscillation in unison, a series of devices in frictional engagement with said plates and movable relative thereto for producing friction, and means carried by certain of said members and adapted for testing the frictional resistance imparted to the sequentially-movable members severally and collectively.

8. The combination with an oscillatory friction plate, of a pair of friction plates mounted for oscillation about the axis of the first plate, means for sequentially uniting the plates of the pair to said first plate for oscillation in unison, a series of members in frictional engagement with said plates and movable relative thereto for producing friction, and means carried by certain of said members and adapted for testing the frictional resistance imparted severally to the plates of the pair.

9. The combination with a pair of friction plates, a pivot member carried thereby and an arm rigid with each plate and constructed and adapted for attachment to a vehicle part, of a friction plate located between the said plates and oscillatory on the pivot member, and an arm rigid with such plate and constructed and adapted for attachment to another vehicle part, a friction plate located on each side of said last-mentioned friction plate between same and the plates of the pair and mounted for oscillation upon said pivot member, each of the side plates being provided with a segmental slot, the slot in one plate being longer than the slot in the other plate, a pin carried by the central plate and extending from the respective sides thereof and located in the said slots of the side plates, and a series of friction members in engagement with the sides of the respective plates and movable relatively to the central plate and the side plates.

10. The combination with a pair of friction plates, a pivot member carried thereby and an arm rigid with each plate and constructed and adapted for attachment to a vehicle part, of a friction plate located between the said plates and oscillatory on the pivot member and an arm rigid with such plate and constructed and adapted for attachment to another vehicle part, a friction plate located on each side of said last-mentioned friction plate between same and the plates of the pair and mounted for oscillation upon said pivot member, each of the side plates being provided with a segmental slot, the slot in one plate being longer than the slot in the other plate, a pin carried by the central plate and extending from the respective sides thereof and located in the said slots of the side plates.

11. A spring controller comprising a series of successively-active friction members, and means carried by certain of said members and adapted for testing the frictional resistance thereof, said means being constructed and arranged for the reception of an operating tool.

In witness whereof I have hereunto set my hand in the presence of two subscribing witnesses.

EDWARD V. HARTFORD.

Witnesses:
HENRIETTA E. WORKMAN,
BERNARD BLASCON.